(12) United States Patent
Liang et al.

(10) Patent No.: US 8,436,504 B2
(45) Date of Patent: May 7, 2013

(54) STATOR FOR AN ELECTRIC MACHINE

(75) Inventors: Feng Liang, Troy, MI (US); Michael W. Degner, Novi, MI (US); Alfredo R. Munoz, Ann Arbor, MI (US); Wen Ouyang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 12/685,271

(22) Filed: Jan. 11, 2010

(65) Prior Publication Data

US 2011/0169369 A1 Jul. 14, 2011

(51) Int. Cl.
*H02K 1/16* (2006.01)

(52) U.S. Cl.
USPC ...... 310/216.111; 310/216.074; 310/216.091; 310/216.092; 310/261.112

(58) Field of Classification Search ... 310/216.064–216.069, 216.071–216.074, 310/216.081, 216.092–216.099, 216.102, 310/216.111, 216.129
See application file for complete search history.

(56) References Cited

U.S. PATENT DOCUMENTS

| | | | | |
|---|---|---|---|---|
| 1,326,340 A | * | 12/1919 | HellMund | 310/216.073 |
| 1,723,912 A | * | 8/1929 | Bergman | 310/176 |
| 2,907,904 A | * | 10/1959 | Carpenter | 310/166 |
| 3,466,480 A | * | 9/1969 | Bunner et al. | 310/216.081 |
| 4,451,752 A | * | 5/1984 | Tahara et al. | 310/186 |
| 4,575,652 A | * | 3/1986 | Gogue | 310/49.55 |
| 4,692,646 A | * | 9/1987 | Gotou | 310/184 |
| 5,051,634 A | * | 9/1991 | Overton | 310/64 |
| 5,729,071 A | | 3/1998 | Steiner | |
| 5,909,072 A | * | 6/1999 | Muller | 310/68 B |
| 6,166,474 A | * | 12/2000 | Kohara et al. | 310/216.093 |
| 6,181,047 B1 | * | 1/2001 | Nitta | 310/216.001 |
| 6,888,283 B2 | | 5/2005 | Yonekura | |
| 6,888,783 B2 | | 5/2005 | Maegawa | |
| 6,946,766 B2 | | 9/2005 | Gary et al. | |
| 7,166,984 B1 | | 1/2007 | Jones et al. | |
| 7,420,308 B2 | | 9/2008 | Ramu et al. | |
| 2003/0052567 A1 | | 3/2003 | Yonekura | |
| 2004/0095035 A1 | * | 5/2004 | Sogabe et al. | 310/216 |
| 2007/0126305 A1 | | 6/2007 | Okuma et al. | |
| 2008/0224558 A1 | | 9/2008 | Ionel | |

* cited by examiner

*Primary Examiner* — Tran Nguyen

(74) *Attorney, Agent, or Firm* — David B. Kelley; Brooks Kushman P.C.

(57) ABSTRACT

An electric machine having a stator surrounding a rotor with an air gap therebetween. The stator has slots in its inner margin for accommodating stator coil windings. Stator teeth defined by the slots have irregular shapes to modify a variable flux flow pattern in the air gap to reduce harmonic torque components with minimal effect on an average value of rotor torque.

13 Claims, 8 Drawing Sheets

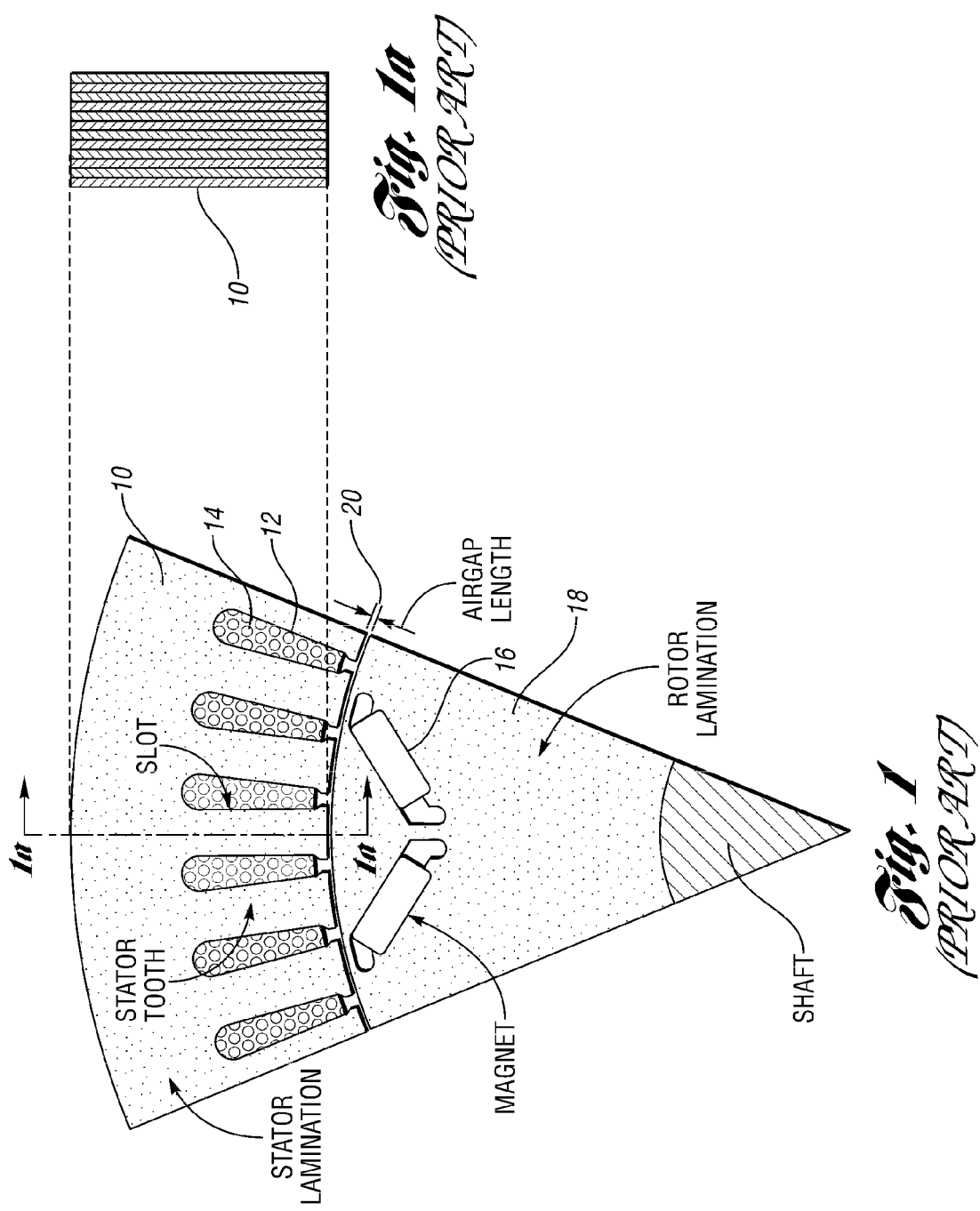

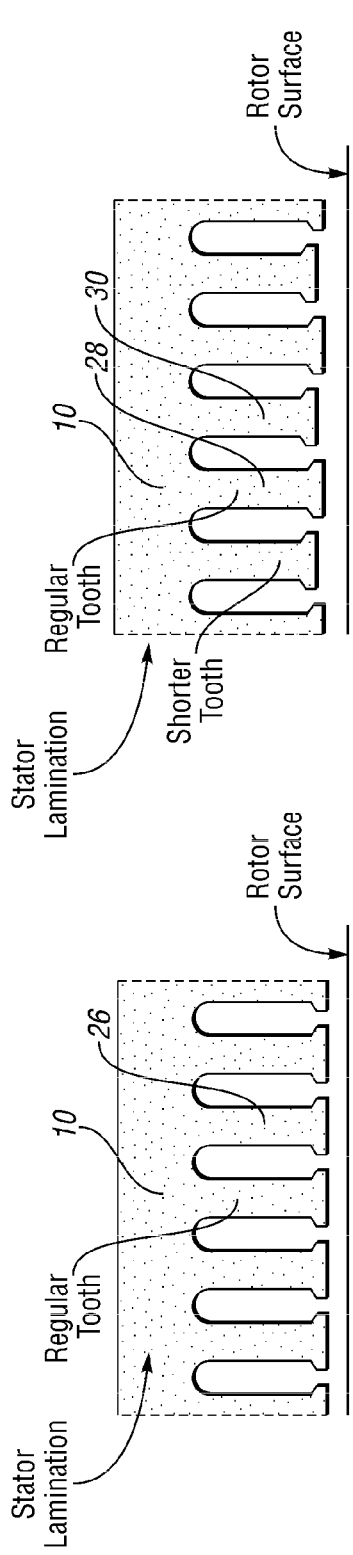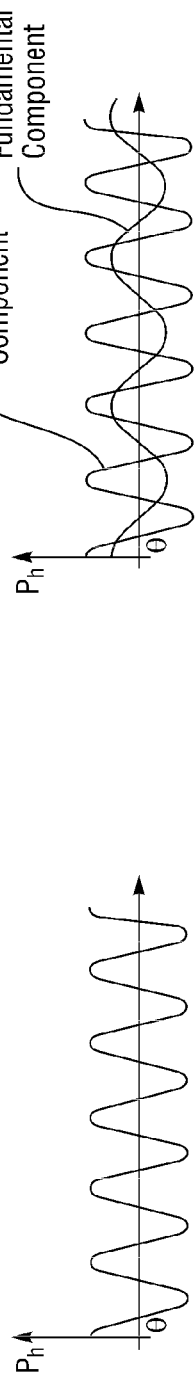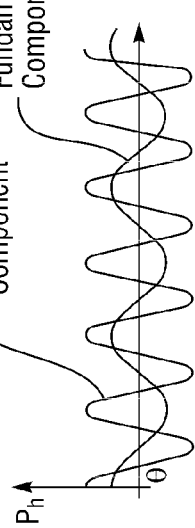
Fig. 3a
Fig. 3b
Fig. 3c

STATOR FOR AN ELECTRIC MACHINE

BACKGROUND

1. Technical Field

The invention relates to an electric machine with stator teeth of irregular geometry for accommodating electrical windings.

2. Background Art

A stator for an electric machine capable of acting as an electric motor and as an electric generator typically has an iron core comprising a stack of laminations surrounding a rotor with an air-gap therebetween. The rotor also has an iron core. In the case of a permanent magnet electric machine, the rotor has sets of permanent magnets that are inserted in openings in the rotor core. The stator laminations have radial slots in which the stator windings are located. The windings carry an electrical excitation current to produce torque. The portions of the laminations between two consecutive slots may be referred to as stator teeth, which channel magnetic flux. In a conventional multiple phase machine, the teeth are of identical shape and size.

Separate groups of stator teeth and the stator windings form multiple magnetic poles that produce a flux flow pattern when the stator coils are energized with a multi-phase sinusoidal voltage. A three-phase electric machine, for example, would have a total of 8 poles and 48 slots. A group of 6 slots would be characteristic of each pole of the particular examples of a 48 slot electric machine herein disclosed. The magnetic flux created by the stator windings interacts with rotor flux created by a rotor for the electric machine so that a rotor torque is created as the stator windings are excited with a multi-phase voltage.

As explained in co-pending patent application Ser. No. 12/566,723, filed Sep. 25, 2009 published Mar. 31, 2011 as U.S. 2011-0074243, entitled "Stator for an Electric Machine", which is assigned to the assignee of the present invention, the torque created by the interaction of the flux field created by the stator windings and the flux field created by the rotor develops a uniform torque component and a varying torque component. The varying torque component is developed by the stator and the rotor because of harmonic magnetic flux distributions in the air-gap. The total output torque of the electric machine is a combination of both components. Because of the variable torque component, a torque ripple phenomenon is created, which results in motor torque output speed oscillations when the electric machine is acting as a motor. If the electric machine is used to create torque in an electric vehicle powertrain, the torque ripple may cause driveline speed oscillations, which can result in vehicle vibration and noise as electric machine vibrations resonate in the vehicle body and chassis structure.

The stator flux and rotor flux are distributed through an air-gap that exists between the outer periphery of the rotor and the inner periphery of the stator. The largest component of the two flux distributions is called the fundamental component. During normal operation of the electric machine, the stator and the rotor fundamental flux rotate in the same direction and at the same speed. Thus, the interaction between the stator and the rotor fundamental fluxes generate a constant torque. Because of the slot openings in the stator, the air-gap permeance is not a constant, which causes so-called harmonic fluxes whose pole number, rotation speed and direction are different from the pole number, rotation speed and direction of the stator and rotor fundamental fluxes. The interaction between the different harmonic fluxes generate variable torques associated with torque ripple. The torque ripple has different components that have different frequencies. The order of a torque ripple is defined as a ratio of the frequency of the torque ripple to the rotary speed of the rotor.

For most applications, the torque ripple needs to be reduced to a manageable level, particularly in the case of hybrid electric vehicle powertrain applications where the torque ripple components occur at variable frequencies proportional to the output shaft speed of an electric traction motor. Higher order of frequencies usually can be filtered out by a limited bandwidth in the mechanical components of the powertrain. Lower frequencies, however, give rise to mechanical oscillations that cannot readily be filtered. Such oscillations are not acceptable in a hybrid electric vehicle powertrain. Presence of torque ripples from the motor at the lower frequencies that cause the motor to produce undesirable vibration and noise.

In application Ser. No. 12/268,592, filed Nov. 11, 2008 entitled "Permanent Magnet Machine with Offset Pole Spacing", the shape of the torque ripple is affected by adjusting the geometry of permanent magnets carried by the rotor. By using magnets in an asymmetric distribution pattern, the total electric machine torque ripple can be reduced in magnitude. The '592 application is assigned to the assignee of the present invention.

A further known method for reducing torque ripple involves a rotor construction consisting of multiple sections that are skewed in small angular increments, one section with respect to the other, so that a magnetic pole of one section is angularly disposed with respect to the pole axis of an adjacent rotor section.

SUMMARY OF EMBODIMENTS OF THE INVENTION

The electric machine of the present invention has stator laminations with irregular teeth. It is capable of reducing the magnitude of the torque ripple previously described while maintaining the average torque of the electric machine substantially constant when compared to a conventional stator with regular tooth geometry for the laminations. The stator lamination design of the present invention can be used in any type of electric machine, although embodiments presently disclosed include an interior permanent magnet machine.

The teeth of the stator laminations are located along the inner diameter of the laminations. The invention modifies the effect of variations of the air-gap permeance while maintaining a consistent average value of the air gap permeance to reduce harmonic fluxes that lead to a reduction of a targeted torque ripple, particularly the $24^{th}$ order torque ripple.

According to one embodiment of the invention, an irregular tooth geometry is achieved by forming the stator teeth in pairs wherein one tooth of each pair is longer than the length of an adjacent tooth of that pair, which produces a permeance variation with a lowered harmonic component.

According to another embodiment of the invention, the teeth can be formed with irregular tooth tip designs, such as a recessed tip for one tooth and a bulged tooth tip for an adjacent tooth.

In another embodiment of the invention, the stator teeth can be arranged in pairs wherein one tooth of each pair may be of conventional design and an adjacent tooth of that pair can be formed with an irregular tooth tip design.

In another embodiment of the invention, the stator teeth can be arranged in a group of three wherein two wide teeth are situated on either side of a narrow tooth.

In another embodiment of the invention, the stator teeth can be arranged in groups of three wherein two teeth are formed with tooth cavities and a third tooth without a cavity is disposed between the two teeth with cavities.

In another embodiment of the invention, the stator teeth can be arranged in groups of two wherein the stator teeth are arranged about the inner periphery of the stator, one tooth of each pair being shorter than the other tooth of that pair.

In another embodiment of the invention, the teeth are arranged in groups wherein the tooth tips of at least two teeth are formed with a shape that is different than the shape of the tips of another tooth in that group.

In another embodiment of the invention, the stator has stator teeth with three different tooth tip profiles, the teeth being arranged with a pattern that repeats every four teeth.

BRIEF DESCRIPTION OF THE DRAWINGS

FIG. 1 is a plan view of a typical rotor lamination for a permanent magnet machine with magnets arranged on the periphery of the rotor in a V-shaped magnet placement.

FIG. 1a is a cross-sectional view of the rotor of FIG. 1 as seen from the plane of section line 1a-1a of FIG. 1.

FIG. 2b is an unwrapped view of the stator section of FIG. 2a.

FIG. 3a shows an unwrapped stator section that defines a single stator pole together with the stator design of FIG. 2b for comparison.

FIG. 3b is a plot of permeance variation P as a function of angular displacement θ for the stator sections of FIG. 3a.

FIG. 3c is a plot of the largest harmonic component $P_h$ for the stator sections of FIG. 3a.

PARTICULAR DESCRIPTION

Figure 2A:
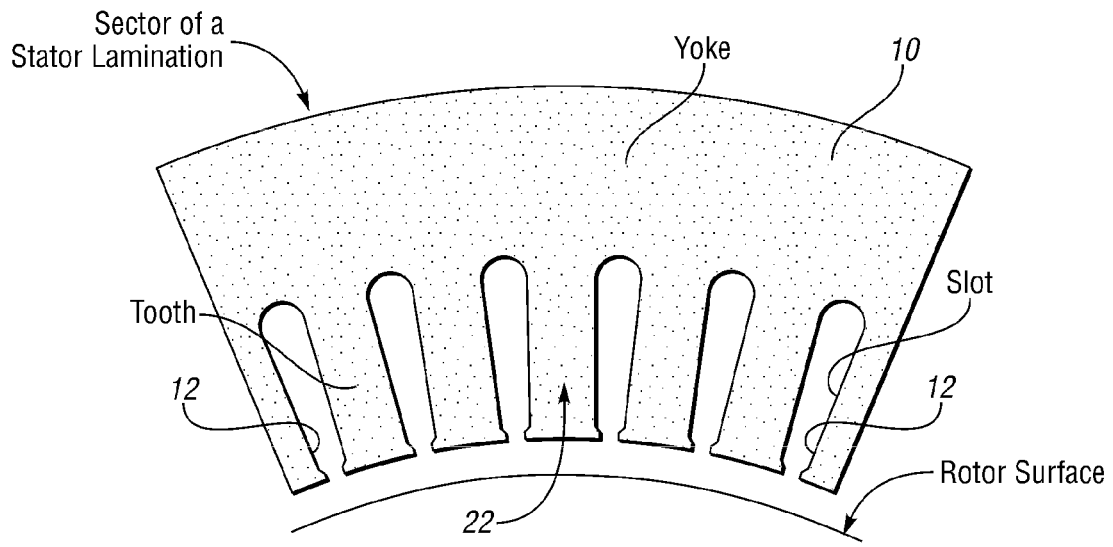
FIG. 2a is a plan view of a lamination section for a single pole section of a typical permanent magnet machine.

FIG. 1 shows a pole section of a typical inner permanent magnet machine with a typical regular tooth slot distribution for a section of the stator shown at 10. The cross-sectional view in FIG. 1a shows the stacking arrangement of the stator lamination 10. The laminations are made of permeable ferrous metal and are formed with radially extending slots 12, which receive windings 14. Permanent magnets 16 are located in openings formed in the rotor laminations 18. The rotor laminations are stacked in a fashion similar to the stacked arrangement for the stator, shown in FIG. 1a. The stator flux and the rotor flux are distributed through the air-gap, shown at 20. Fundamental torque components are created by the interaction of the rotor flux and the stator flux. As previously mentioned, the fundamental flux patterns rotate in the same direction and at the same speed, thereby creating a constant torque.

Since a discontinuity in the stator lamination is caused by the slots 12, the air-gap permeance is not constant so the harmonic fluxes have a pole number, rotation speed, and direction that are different from those of the stator and rotor fundamental fluxes. This creates a torque ripple, as previously explained. The order of a torque ripple is defined as the ratio of the frequency of the torque ripple to the speed of the rotor in revolutions per second.

Figure 2B:
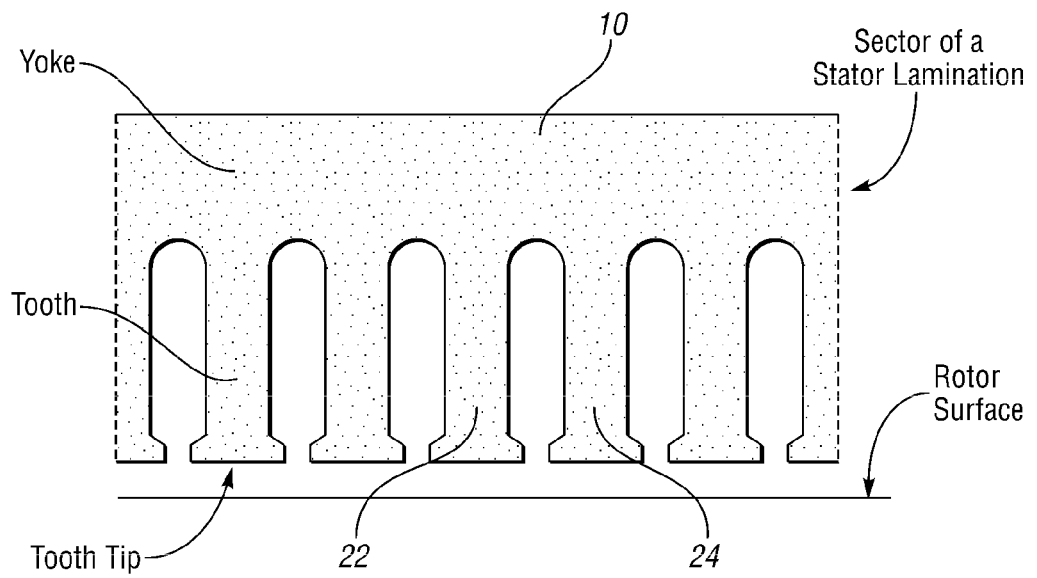

FIG. 2a is a view of the stator section 10 without the windings shown FIG. 1. The stator openings or slots define the radial teeth 22. FIG. 2b is an unwrapped view of the stator section shown in FIG. 2a, whereby the tooth arrangement is a linear representation. Each of the teeth is identical in shape to the others, which results in a pattern that repeats itself along the periphery of the stator. The tooth tips 24 are shaped to follow a circular contour corresponding to a diameter slightly larger than the rotor outer diameter. The tooth slot pattern, shown in FIG. 2b, results in harmonic torque components, as previously explained.

The present invention will modify the variation of the air-gap permeance caused by the stator slots, thereby reducing harmonic fluxes, which results in a reduction in the amplitude of the torque ripples, particularly the $24^{th}$ order torque ripples. This reduction is accomplished by using a sequence of irregular tooth shapes. The shape of the teeth is designed to modulate the air-gap permeance caused by the slotting of the stator. To maintain the same average torque and the same stator winding losses, the lamination designs of the invention have the same slot area, whereby the main flux flow path is not changed. The principle of permeance modulation is illustrated by the lamination designs of FIGS. 3a through FIG. 8.

Figure 9:
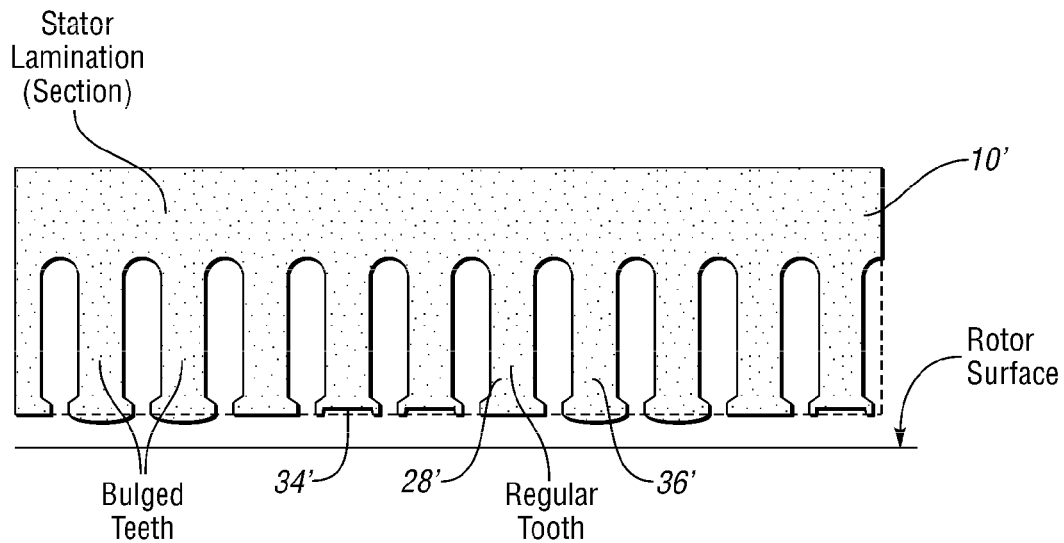
FIG. 9 is a view of a stator lamination with irregular tooth designs with three types of tooth tip profiles.
Figure 10:
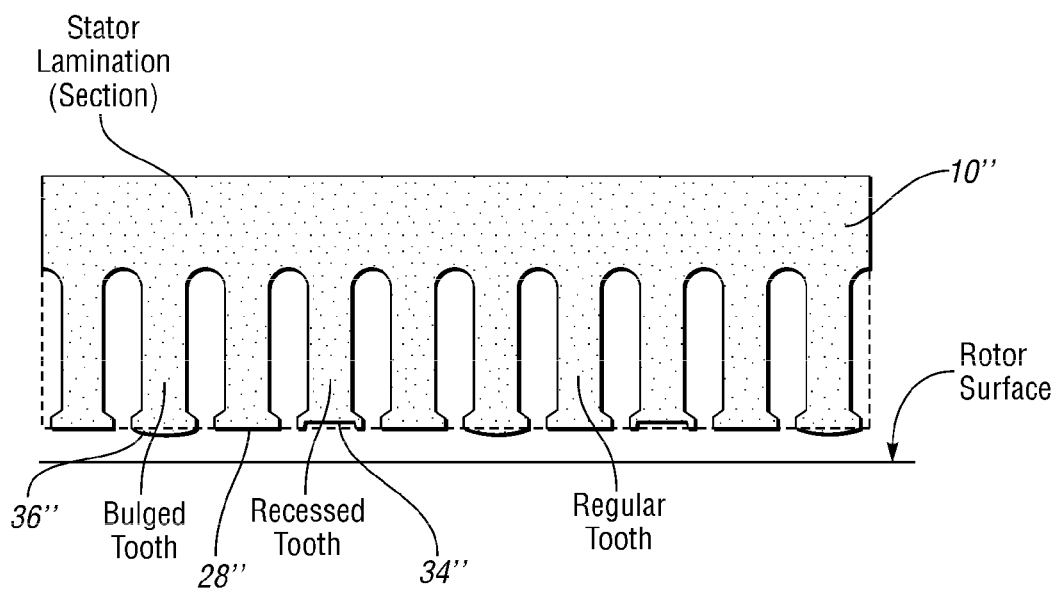
FIG. 10 is a view of a stator lamination design with irregular teeth with three different types of tooth tip profiles.

The use of different teeth profiles previously discussed can be generalized to other numbers of multiple teeth combinations. Examples of other combinations of irregular teeth pattern configurations are shown in FIGS. 9 and 10. In these two cases, three different teeth profiles are combined to create the stator laminations with different stator teeth patterns.

Figure 2C:
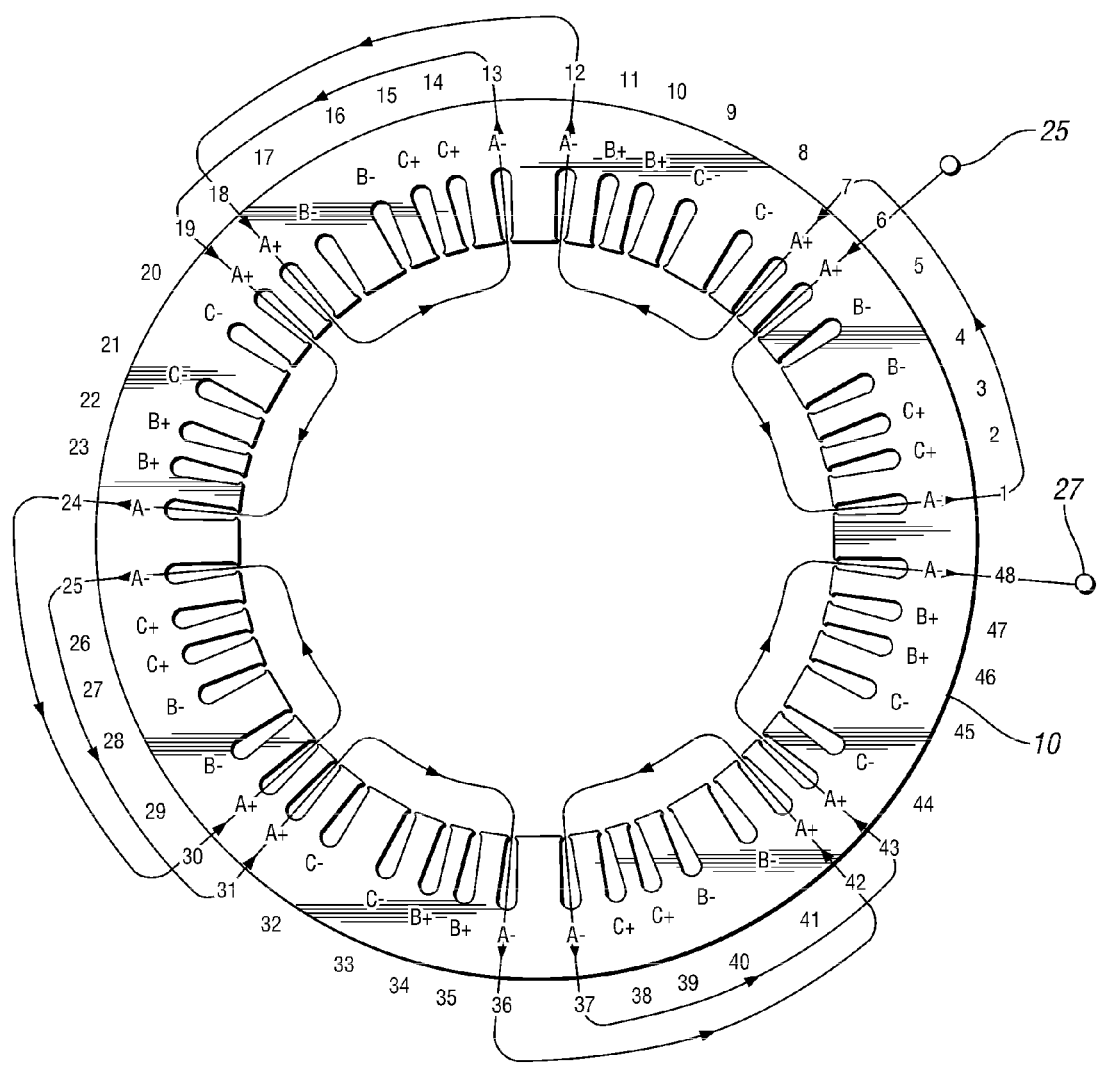
FIG. 2c is a plan view of a stator lamination wherein the disposition of the stator windings in the stator slot is shown in diagrammatic form in such a way that the windings form eight poles for a stator winding with 48 slots.
Figure 4:
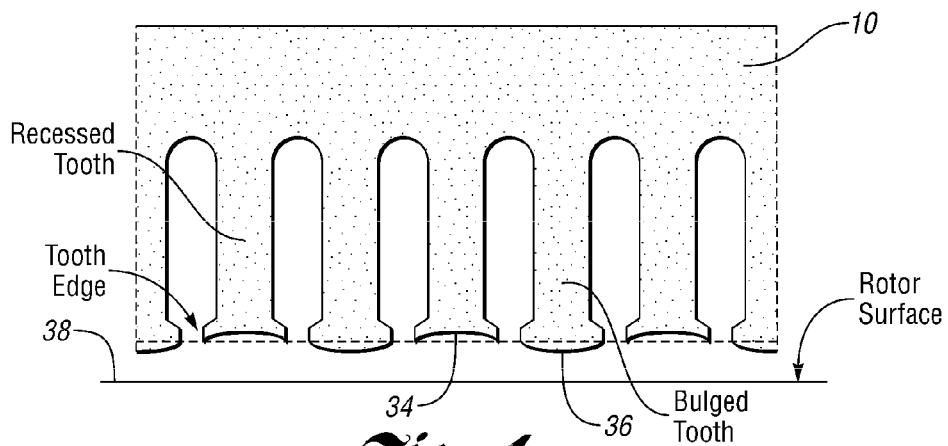
FIG. 4 is a unwrapped view of the teeth of a lamination design with irregular tooth tip geometries.

For the purpose of describing the stator coil winding pattern, it will be assumed that the winding begins at terminal 25 in FIG. 2c. The winding illustrated in FIG. 2c has a pattern that is similar to the winding pattern for the stator design of each of the embodiments. FIG. 2c shows a slot pattern for a second embodiment of the invention, which has multiple slot groups, each group having teeth of three different peripheral widths. The winding enters slot #6 and extends to slot #1. The winding returns through slot #1. It then extends to slot #7 and enters slot #7. It returns through slot #12 and then enters slot #18. The winding then returns through slot #13 and enters through slot #19. The winding then returns through slot #24 and enters through slot #30. The winding then returns through slot #25 and enters through slot #31. The winding then returns through slot #36 and enters through slot #42. The winding then returns through slot #37 and enters slot #43. It is returned through slot #48. The winding then terminates at terminal 27, thereby completing the winding pattern for the first phase of a three-phase electric machine.

The windings for the other two phases B and C of a three-phase machine have a similar entry and return pattern. The teeth defined by slots 1 through 6 and their respective windings create a first pole. Similarly, a second pole is created by the teeth and the windings for slots #7 through #12. A third pole is established by the slots and the windings for slots #13 through #18. A fourth pole is established by the teeth and the windings for slots #19 through #24. A fifth pole is established by the teeth and the windings for slots #25 through #30. A sixth pole is established by the teeth and the windings for slots #31 through #36. A seventh pole is established by the teeth and the windings for slots #37 through #42. An eighth pole is established by the teeth and the windings for slots #43 through #48. Thus, there are a total of eight pole and 48 slots, which define three phases identified by the letters A, B and C. As can be seen from the winding pattern for phase A shown in FIG. 2c, all of the coils have substantially the same slot span. In this embodiment, each coil spans six slots.

FIG. 3a shows a lamination with regular teeth 26 and laminations with irregular teeth 28, 30 (every other tooth is shorter). FIG. 3b illustrates the air-gap permeance variation due to the stator slot opening. Regular shaped teeth have a regular variation as shown in the left view and an irregular variation as shown in the right view. FIG. 3c shows in the left view and in the right view the lowest harmonic components for both sets of laminations, respectively. The order of the lowest permeance harmonic for a conventional lamination with regular teeth is the same as the number of teeth. On the other hand, because of the alternate tooth pattern chosen, the lamination with irregular teeth contains a strong low order harmonic which is half the number of teeth.

The air-gap permeance can be modulated in a number of different ways, including adjusting the relative height of adjacent teeth. From a practical perspective, a smooth transition going from one tooth edge to the next may be achieved by using the lamination design shown in FIG. 4. In this case, the length of the edges of all teeth may be identical to a conventional tooth length, a minimum air-gap length being shown at 32 in FIG. 5. To achieve the permeance modulation, the shape of the tooth tops are modified, as shown at 34 and 36 in FIG. 4, in such a way that every other tooth has a recessed tip 34, while the other tooth tips have a bulged shape 36. To preserve the minimum air-gap length 32, the outermost points of the tooth tips may be located at the same distance with respect to the rotor surface 38 as that of a regular tooth on a conventional lamination.

Figure 5:
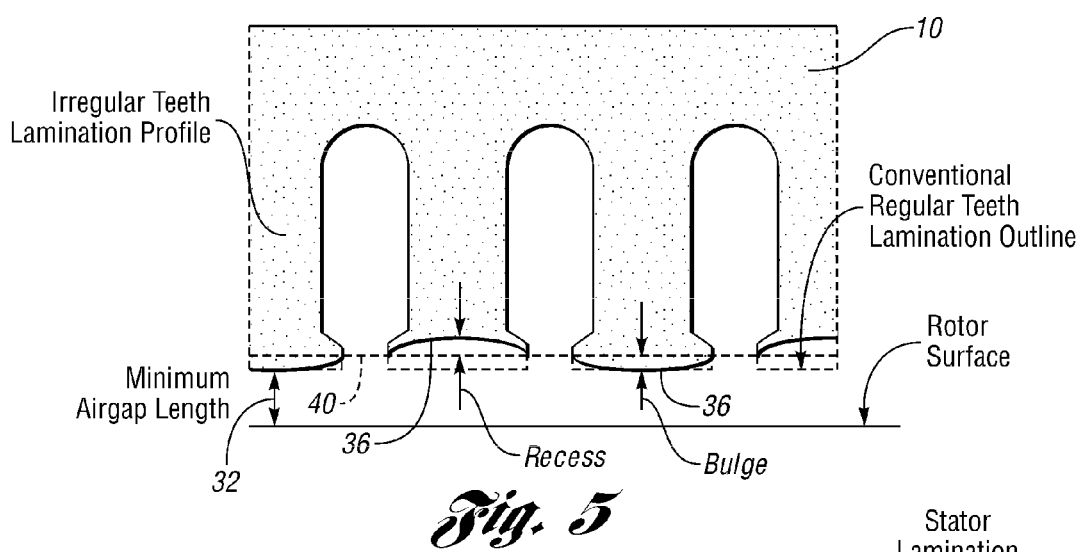
FIG. 5 is a design showing a comparison of irregular teeth and a conventional tooth design.

FIG. 5 shows the irregular teeth lamination design of FIG. 4a overlaid with a conventional lamination outline 40. A tip recess and a tip bulge are shown by the dimensional arrows.

Figure 6:
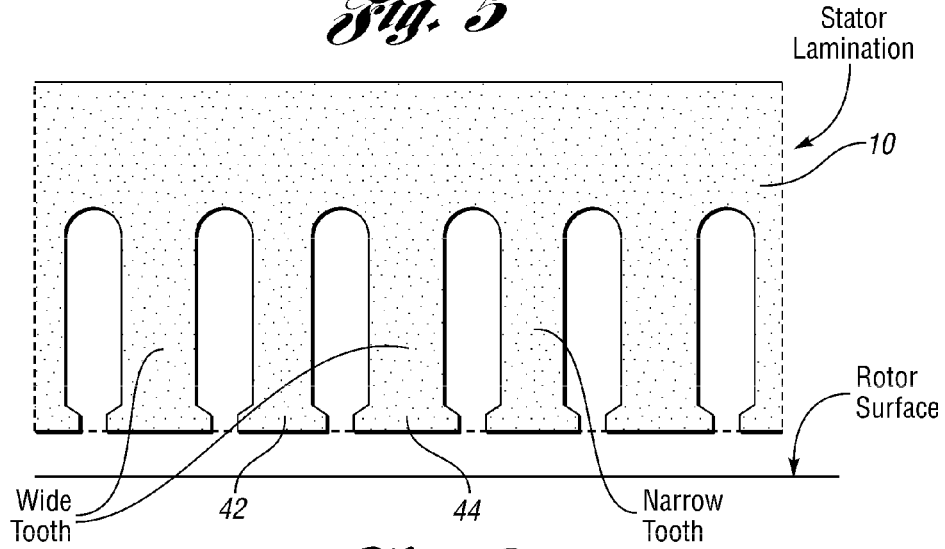
FIG. 6 is a view of a lamination design with irregular tooth widths.

Another way to accomplish the desired permeance modulation along the air-gap (hence reducing the torque ripple) is by changing the complete tooth shape in such a way that every other tooth exhibits a slightly lower permeance than an adjacent tooth, as shown in FIG. 6. This can be accomplished by making every other tooth slightly narrower, as shown at 42. The size of each slot may be kept unchanged, resulting in half of the teeth being wider, as shown at 44, than the width of the other half of the teeth.

Figure 7:
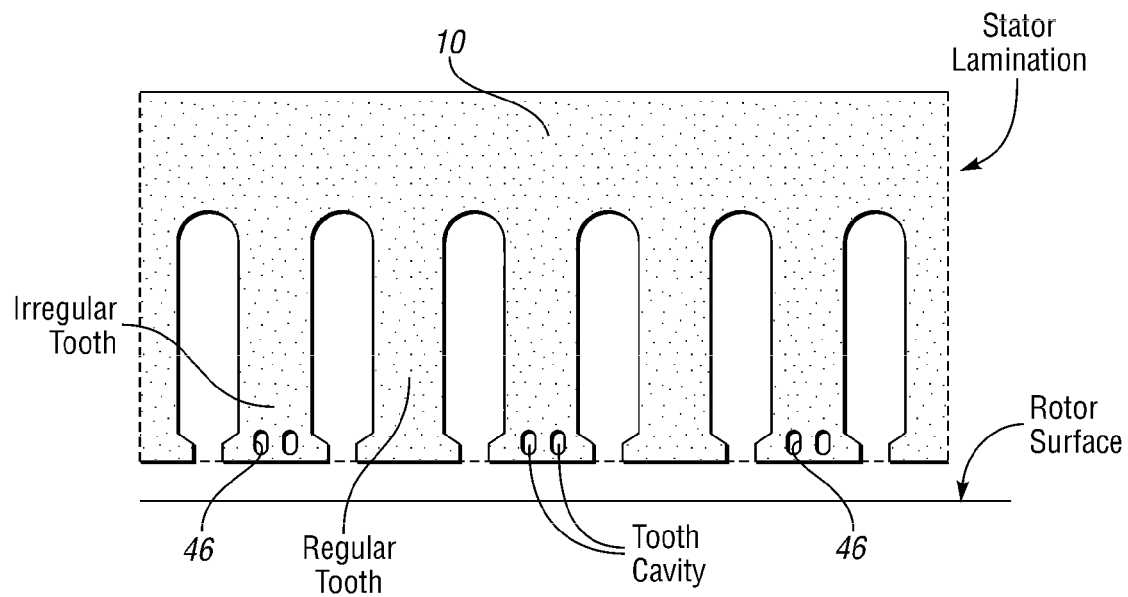
FIG. 7 is a view of a lamination design with irregular teeth having tooth cavities.

The equivalent permeance of a tooth could be changed also by introducing one or more cavities 46 in a tooth tip, as shown in FIG. 7. If every other tooth is designed with one or more cavities while the other half remains unchanged with respect to a conventional design, the result is a lamination profile in which the outer shapes of all the teeth are identical, but those teeth containing a cavity will have a lower permeance resulting in a similar permeance modulation effect as previously described.

Figure 8:
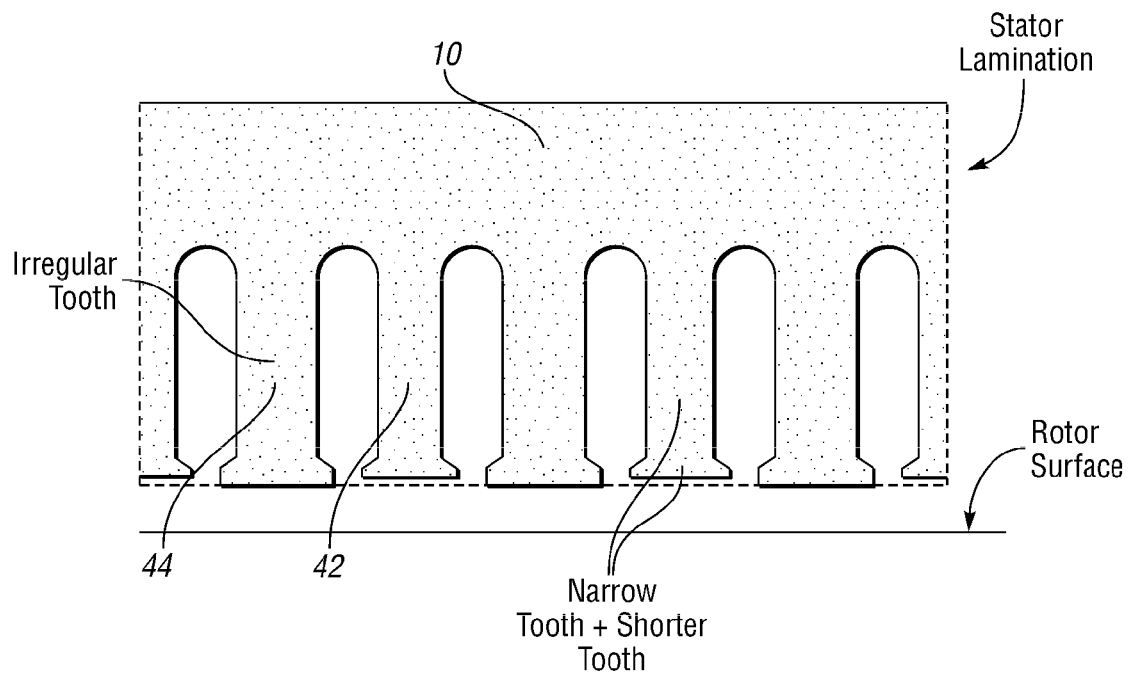
FIG. 8 is a view of a lamination design with combined narrow tooth widths and teeth of different lengths.

Finally, the design options shown in FIGS. 3a through 7 can be combined in a number of ways to yield new design options that would take advantage of the compounded effect of each individual design. An example of one of such possible combinations is shown in FIG. 8. FIG. 8 shows a lamination design combining irregular tooth designs described in FIGS. 3a and 7. In this case, the benefit of having a shorter tooth design (FIGS. 3a-3c) is combined with a narrow tooth design to yield an even larger torque ripple reduction.

FIG. 9 shows a design having three different tooth profiles, shown at 28', 34' and 36' that create a pattern that repeats itself for each group of six teeth.

FIG. 10 shows an example of irregular teeth with three types of tooth tip profiles. The tooth tip distribution pattern repeats for every group of four teeth.

To quantify the benefits of the new stator lamination designs, a set of finite element simulations may be run for a number of different tooth top designs following the patterns shown in FIGS. 3a-10. The results indicate that the proposed irregular teeth designs can effectively reduce the $24^{th}$ order torque ripple component (for a stator with 48 teeth) with only a minor impact on the average torque value.

Figure 11:
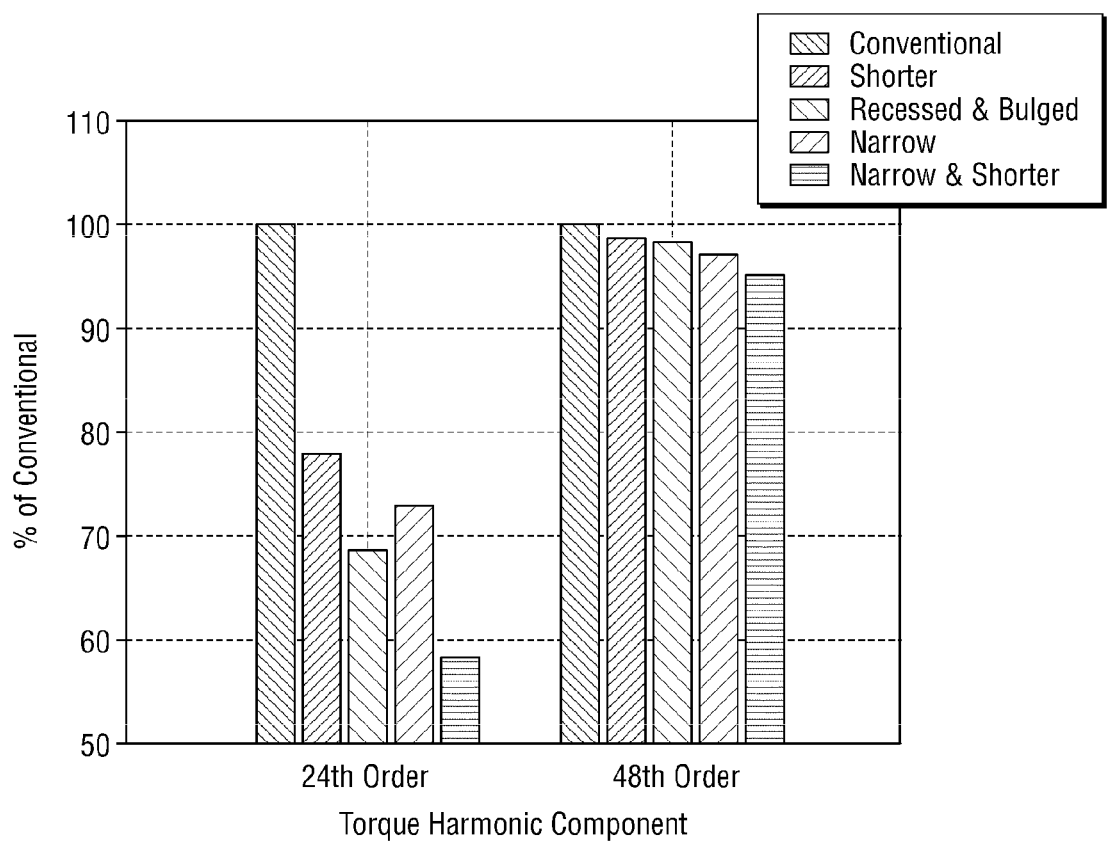
FIG. 11 is a chart showing amplitudes of torque components for conventional and irregular tooth designs.

FIG. 11 shows a comparison of the relative magnitudes of the $24^{th}$ and $48^{th}$ order harmonics for a stator that includes the disclosed embodiments of the invention. As shown, the narrow and shorter tooth design of FIG. 8, for example, has a $24^{th}$ order torque harmonic component that may be less than 60% of the torque harmonic component of a conventional design.

Although embodiments of the invention are disclosed, modifications may be made by persons skilled in the art without departing from the scope of the invention. All such modifications and equivalents thereof are defined by the following claims.

What is claimed:

1. An electric machine comprising a rotor and a stator;
   the stator comprising teeth defined by slots extending radially throughout an inner circular margin of the stator, each tooth fitted with electrical coil windings;
   wherein the teeth have axially constant and circumferentially irregular tooth shapes, varying in at least tooth width and radial displacement at an innermost end of each tooth; and
   wherein the windings establish eight poles and three phases, each winding spanning six slots.

2. The electric machine set forth in claim 1 wherein the stator teeth are arranged in multiple groups about the circular margin, each group defining a separate magnetic pole.

3. A stator for an electric machine having an inner margin adapted to surround a rotor with an air gap therebetween, the stator comprising stacked laminations of permeable metal, the stacked laminations having slots in the inner stator margin accommodating electrical coil windings, the windings establishing three phases and eight poles, each of the coil windings having a six slot span;
   the slots defining axially constant and circumferentially irregularly shaped stator teeth, the teeth comprising at least three different tooth profiles and varying in at least length and width, modifying local air gap variations while maintaining a relatively unchanged average value of the air gap permeance.

4. The electric machine set forth in claim 1 wherein the stator has multiple sets of teeth in a repeating pattern about the inner margin of the stator, one tooth of each set being shorter than at least one other tooth of the set, and one tooth of each set being wider than at least one other tooth of the set.

5. The stator set forth in claim 3 wherein the stator has multiple sets of teeth in a repeating pattern about the inner margin of the stator, one tooth of each set being shorter than at least one other tooth of the set, and one tooth of each set being wider than at least one other tooth of the set.

6. The electric machine set forth in claim 1 wherein the stator has multiple sets of teeth arranged about the inner stator margin, a tip of at least one tooth of each of multiple sets of teeth being bulged in shape and a tip of at least one other tooth of each set being recessed.

7. The stator set forth in claim 3 wherein the stator has multiple groups of teeth arranged about the inner stator margin, a tip of at least one tooth of each of multiple groups of teeth being bulged in shape and a tip of at least one other tooth of each group being recessed.

8. The electric machine set forth in claim 1 wherein the stator has multiple groups of teeth, at least one tooth of each group having at least one cavity.

9. The stator as set forth in claim 3 wherein the stator has multiple sets of teeth, at least one tooth of each set having at least one cavity.

10. The electric machine as set forth in claim 1 wherein the stator has multiple sets of three teeth, two teeth of each set having tooth tip profiles that are different than a profile of a third tooth tip of that set.

11. The stator as set forth in claim 3 wherein the stator has multiple sets of three teeth, two teeth of each set having tooth tip profiles that are different than a profile of a third tooth tip of that set.

12. The electric machine set forth in claim 1 wherein the stator has teeth of at least three different widths.

13. The stator set forth in claim 3 wherein the stator has teeth of at least three different widths.

\* \* \* \* \*